US008092304B2

(12) United States Patent
Hedrick et al.

(10) Patent No.: US 8,092,304 B2
(45) Date of Patent: Jan. 10, 2012

(54) SIMULATION OF MECHANICAL REELS OF GAMING MACHINES

(75) Inventors: Randy Hedrick, Reno, NV (US); Russell Chudd, Reno, NV (US); John Leagh Beadell, Sparks, NV (US); Fred Nesemeier, Reno, NV (US)

(73) Assignee: IGT, Reno, NV (US)

( * ) Notice: Subject to any disclaimer, the term of this patent is extended or adjusted under 35 U.S.C. 154(b) by 1064 days.

(21) Appl. No.: 11/557,876

(22) Filed: Nov. 8, 2006

(65) Prior Publication Data

US 2008/0108422 A1 May 8, 2008

(51) Int. Cl.

*A63F 9/24* (2006.01)
*A63F 13/00* (2006.01)
*G06F 17/00* (2006.01)
*G06F 19/00* (2006.01)

(52) U.S. Cl. ........................................... 463/31; 463/16

(58) Field of Classification Search .................... 463/31, 463/19–22, 42

See application file for complete search history.

(56) References Cited

U.S. PATENT DOCUMENTS 4,319,805 A 3/1982 Nicholas
4,448,419 A 5/1984 Telnaes
5,188,363 A 2/1993 Marnell et al.
5,537,251 A 7/1996 Shimada
5,788,573 A 8/1998 Baerlocher et al.
5,848,932 A 12/1998 Adams
5,889,996 A 3/1999 Adams
6,027,115 A * 2/2000 Griswold et al. ......... 273/143 R
6,135,884 A 10/2000 Hedrick et al.
6,251,014 B1 6/2001 Stockdale et al.
6,336,863 B1 1/2002 Baerlocher et al.
6,344,861 B1 2/2002 Naughton et al.
6,406,369 B1 6/2002 Baerlocher et al.
6,431,711 B1 8/2002 Pinhanez
6,503,147 B1 1/2003 Stockdale et al.
6,533,664 B1 3/2003 Crumby
6,648,758 B2 11/2003 Bennett et al.
6,705,944 B2 3/2004 Luciano
6,761,313 B2 7/2004 Hsieh et al.
6,793,577 B1 9/2004 Wilkins et al.

(Continued)

FOREIGN PATENT DOCUMENTS

WO WO 2007-024202 3/2007

(Continued)

OTHER PUBLICATIONS

U.S. Appl. No. 60/818,127, filed Jun. 30, 2006 consisting of Drawings and Specification.*

(Continued)

*Primary Examiner* — David L Lewis
*Assistant Examiner* — Reginald Renwick
(74) *Attorney, Agent, or Firm* — Weaver Austin Villeneuve & Sampson LLP

(57) ABSTRACT

Techniques for simulating mechanical reels are disclosed. The techniques are especially suitable for simulating mechanical reels typically used for reel-based games in gaming machines (or units). Image of at least one rotating mechanical reel can be projected on at least one projection surface to effectively simulate at least one mechanical reel. The image can be projected on multiple rotating projection surfaces (or reels) to give a closer illusion of a mechanical reel-based game. Projection can be accomplished by using a projection system coupled to one or more processors that processes projection data.

23 Claims, 12 Drawing Sheets

U.S. PATENT DOCUMENTS

| | | | | |
|---|---|---|---|---|
| 6,827,646 | B2 | 12/2004 | Adams | |
| 6,843,725 | B2 | 1/2005 | Nelson | |
| 6,857,959 | B1 | 2/2005 | Nguyen | |
| 6,860,811 | B1 | 3/2005 | Wilkins | |
| 6,905,405 | B2 | 6/2005 | McClintic | |
| 6,921,335 | B2 | 7/2005 | Rodgers et al. | |
| 6,934,607 | B2 | 8/2005 | Blaine | |
| 7,166,029 | B2 | 1/2007 | Enzminger | |
| 7,309,284 | B2 | 12/2007 | Griswold et al. | |
| 7,384,339 | B2 | 6/2008 | LeMay et al. | |
| 7,452,276 | B2 * | 11/2008 | Loose et al. | 463/31 |
| 7,559,840 | B1 | 7/2009 | D'Avanzo | |
| 7,744,460 | B2 * | 6/2010 | Walker et al. | 463/21 |
| 2002/0198038 | A1 | 12/2002 | Adams | |
| 2003/0060269 | A1 | 3/2003 | Paulsen et al. | |
| 2003/0064799 | A1 | 4/2003 | Goins et al. | |
| 2003/0069063 | A1 | 4/2003 | Bilyeu et al. | |
| 2003/0157980 | A1 * | 8/2003 | Loose et al. | 463/20 |
| 2003/0195034 | A1 | 10/2003 | Dunaevsky | |
| 2004/0053687 | A1 | 3/2004 | Nordman et al. | |
| 2004/0214630 | A1 | 10/2004 | Mayeroff | |
| 2004/0242315 | A1 | 12/2004 | Paulsen et al. | |
| 2004/0248640 | A1 | 12/2004 | Kaminkow et al. | |
| 2004/0266515 | A1 | 12/2004 | Gauselmann | |
| 2004/0266536 | A1 | 12/2004 | Mattice et al. | |
| 2005/0037843 | A1 | 2/2005 | Wells et al. | |
| 2005/0049048 | A1 | 3/2005 | Wilder et al. | |
| 2005/0060051 | A1 | 3/2005 | Mattice et al. | |
| 2005/0153776 | A1 | 7/2005 | LeMay et al. | |
| 2006/0038965 | A1 | 2/2006 | Hennes | |
| 2006/0111168 | A1 | 5/2006 | Nguyen | |
| 2006/0135248 | A1 | 6/2006 | Anderson et al. | |
| 2006/0247023 | A1 | 11/2006 | Inoue | |
| 2007/0054723 | A1 | 3/2007 | Mattice et al. | |
| 2007/0054730 | A1 | 3/2007 | Mattice et al. | |
| 2007/0060270 | A1 | 3/2007 | Seelig et al. | |
| 2007/0149281 | A1 | 6/2007 | Gadda et al. | |
| 2008/0004104 | A1 * | 1/2008 | Durham et al. | 463/20 |
| 2008/0020816 | A1 | 1/2008 | Griswold et al. | |
| 2011/0118013 | A1 | 5/2011 | Mattice et al. | |

FOREIGN PATENT DOCUMENTS

| | | |
|---|---|---|
| WO | 2008/109762 | 9/2008 |

OTHER PUBLICATIONS

Durham U.S. Appl. No. 60/818,127, filed Jun. 30, 2006 as discussed in Durham et al. U.S. Patent No. 7,654,899.*

US Office Action dated Sep. 30, 2009 from U.S. Appl. No. 11/218,688.

International Search Report and Written Opinion for PCT/US2008/056075, mailed Sep. 30, 2008.

US Office Action dated Jul. 1, 2009 from U.S. Appl. No. 11/683,296.

US Office Action dated Dec. 30, 2009 from U.S. Appl. No. 11/683,296.

US Office Action Final dated Apr. 9, 2010 from U.S. Appl. No. 11/218,688.

International Preliminary Report on Patentability dated Sep. 8, 2009 for PCT Application No. PCT/US2008/056075.

U.S. Appl. No. 13/184,322 Filed Jul. 15, 2011.

US Office Action dated Aug. 8, 2011, issued in U.S. Appl. No. 11/218,688.

AU Examiner's First Report dated Jan. 20, 2011 issued in Application No. 2006204652.

Pico Projector Displays: Overview (2009), Microvision, Inc., sales document retrieved from the Internet at http://www.microvision.com/pico_projector, on Apr. 26, 2010.

PicoP™ Evaluation Kit (PEK) (2009), Preliminary Specifications, Document No. DA0124619, Microvision, Inc., Redmond, WA, 1 page.

* cited by examiner

SIMULATION OF MECHANICAL REELS OF GAMING MACHINES

BACKGROUND OF THE INVENTION

Conventional reel-based gaming machines (or units) are generally known and have been used in various gaming environments (e.g., casinos). Typically, a conventional reel-based gaming machine uses a plurality of mechanical (physical or real) reels configured to rotate about a common axis. Each mechanical reel has multiple symbols (or indicia) affixed (or printed) on its periphery. In order to play a conventional reel-based game, a person (or player) can pull a lever or depress a triggering button. A random number generator can provide a first number, which in turn corresponds to a symbol printed on the periphery of a reel. The first reel is then stopped to display the selected symbol. In a similar manner, the second and third reels can display symbols corresponding to second and third numbers generated by the random number generator. After the reels have stopped spinning, a microprocessor can evaluate the outcome of the first, second, and third generated random numbers to determine if there is a winning combination. If there is a winning combination, the winning combination can be displayed and a payout may be awarded to the player.

In a traditional, three-reel, mechanical slot machine, each reel, can, for example, have twenty-two stops or indicia which can be displayed as part of a multiple reel payline combination. The probability for paying off on a specific combination of indicia can be dependent upon the number of reels in play, the number of symbols on each reel, and the number of winning symbol combinations. For instance, the lowest probability, one in which there is only one winning combination, can be mathematically represented as 1:N.R where N is the number of indicia on each reel and R is the number of reels. Therefore, for a traditional, three-reel mechanical slot machine having twenty-two symbols, the lowest probability that can be obtained is 1:22.3 or 1:10,648. Thus, for this type of slot machine to be commercially viable, the maximum jackpot payable by such slot machine is limited to the amount that could be paid one in every ten thousand six hundred forty eight plays.

As today's slot machine players of reel-based games become more sophisticated, the market demands higher payouts and greater game variation to maintain and increase player appeal. To allow for higher purses, and still remain commercially viable, a traditional slot machine can either increase the number of symbols per reel, or alternatively add reels to the machine. Both alternatives, however, have proven undesirable effects. For example, it is difficult to provide more than about twenty-five symbols per reel as the reel then becomes too large to fit within the physical dimensions of the standard-sized slot machine. Similarly, it has been observed that slot machines having more than three reels are less appealing to slot machine players.

One alternative technique for increasing the jackpot size in slot games employs a "virtual reel," described in U.S. Pat. No. 4,448,419 to Telnaes. In general, a "virtual reel" can, for example, be a software program which allows a slot machine to increase the payout without increasing the number of reels or the number of symbols per reel. The virtual reel software program contains instructions which map a number of virtual symbols to physical symbols on the slot machine reel. For example, a virtual reel may contain forty-four possible virtual symbols with each virtual symbol corresponding to one specific physical symbol on a twenty-two-symbol reel. Therefore, in this example, the virtual reel effectively raises the lowest probability that can be obtained to 1:443 or 1:85,184, which greatly increases the available largest payout.

During a typical virtual reel slot machine play, a slot player initiates spinning of the slot machine reels through any number of means, including pulling a handle. The "virtual reel" software program then randomly selects a symbol from the virtual reel, while the mechanical reel is spinning and observable by the player through a display glass. A control circuit then causes the spinning reel to stop at the symbol selected by the software. Therefore, the software controls the actual outcome of the game and the mechanical reel merely acts as a display device.

An alternative technique for increasing the jackpot size in slot games employs a slot machine reel with luminescent display elements described in the U.S. Pat. No. 6,027,115 to Griswold et al. In general, slot machines utilizing the luminescent display element technique can provide reels in which "symbol regions" contain electroluminescent elements. Multiple electroluminescent elements may be arranged in each symbol region to allow a given symbol to be displayed in multiple formats, with each format representing an independent indicia for payout purposes. For example, a "7" symbol could be displayed with its outline illuminated, with interior cross hatching, with a combination of cross hatching and outline illuminated, or with different colors. Thus, each possible symbol may appear to a player to be different physical symbol, despite the fact it exists within the same physical symbol region. By utilizing this technique, or by combining this technique with a virtual reel, the designer has still greater flexibility in creating higher odds and offering a much larger payout.

One drawback to either a virtual reel or a reel containing an electroluminescent display is that the slot machine game play is still limited by the number of unique symbols that can be displayed by the mechanical reel. In other words, in utilizing a traditional mechanical reel with twenty-two symbols, a virtual reel can display, at most, twenty-two unique symbols. Similarly, while an electroluminescent reel may increase the number of unique symbols possible, the electroluminescent reel is also limited by the number of unique luminescent patterns. Still further, if the owner of the slot machine utilizing either technique wishes to change the gaming symbols, the slot machine reels must be mechanically replaced, resulting in extremely costly "down-time" for the machine and consequently lost revenue for the owner.

To allow a gaming machine with an infinite number of display symbols, game manufacturers have utilized flat, rigid panel displays, (i.e., Liquid Crystal Displays ("LCDs"), or Light Emitting Diode ("LED") displays) similar to a display of a computer screen. By utilizing a rigid display panel, a computer processor is able to create, display, manipulate and control a "virtual slot machine" without any mechanical spinning reels, further allowing for an infinite number of possible symbol displays and increased payouts. However, while the use of the virtual slot machine has proven popular in today's personal computer market, it has not met with much success in casinos, as a slot machine player desires the visual stimulation, and excitement of a traditional, spinning reel slot machine.

SUMMARY OF THE INVENTION

Broadly speaking, the invention relates to techniques for simulating mechanical reels. The techniques are especially suitable for simulating mechanical reels typically used for reel-based games in conventional gaming machines (or units). In accordance with one aspect of the invention, image of at least one rotating mechanical reel is projected on at least one projection surface to effectively simulate at least one mechanical reel. The image can be projected on multiple rotating projection surfaces (or reels) to give a closer illusion of a mechanical reel-based game. Projection can be accomplished by using a projection system coupled to one or more processors that processes projection data. Projection data can be downloaded and/or stored on a gaming machine. The projection data can effectively represent images to be projected on one or more projection surfaces. Projection can be synchronized with the rotation of projection surface as, for example, multiple projection reels rotate about the same horizontal axis (or X-axis). In addition to a projector (e.g., a DLP projector), the projection system can include one or more lenses and/or mirrors. A single projection system which is centrally located with respect to multiple projection reels can be used in accordance with one embodiment of the invention. Further, a rotation mechanism (e.g., stepper motor, DC motor) can be configured about the periphery of a projection reels to externally drive (or rotate) a projection surface without interfering with the projection system. In addition to symbols projected on projection surfaces (e.g., rotating projection reels), the projection system can project virtual any other images including those used in a reel-based game (e.g., bet lines, score, credit), thereby allowing a dynamic environment where various components of the game can be quickly altered.

The invention can be implemented in numerous ways, including a method, an apparatus, a computer readable medium, a computing device, or a signal embodied in a carrier wave (e.g., a signal transmitted from a server to client machine). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
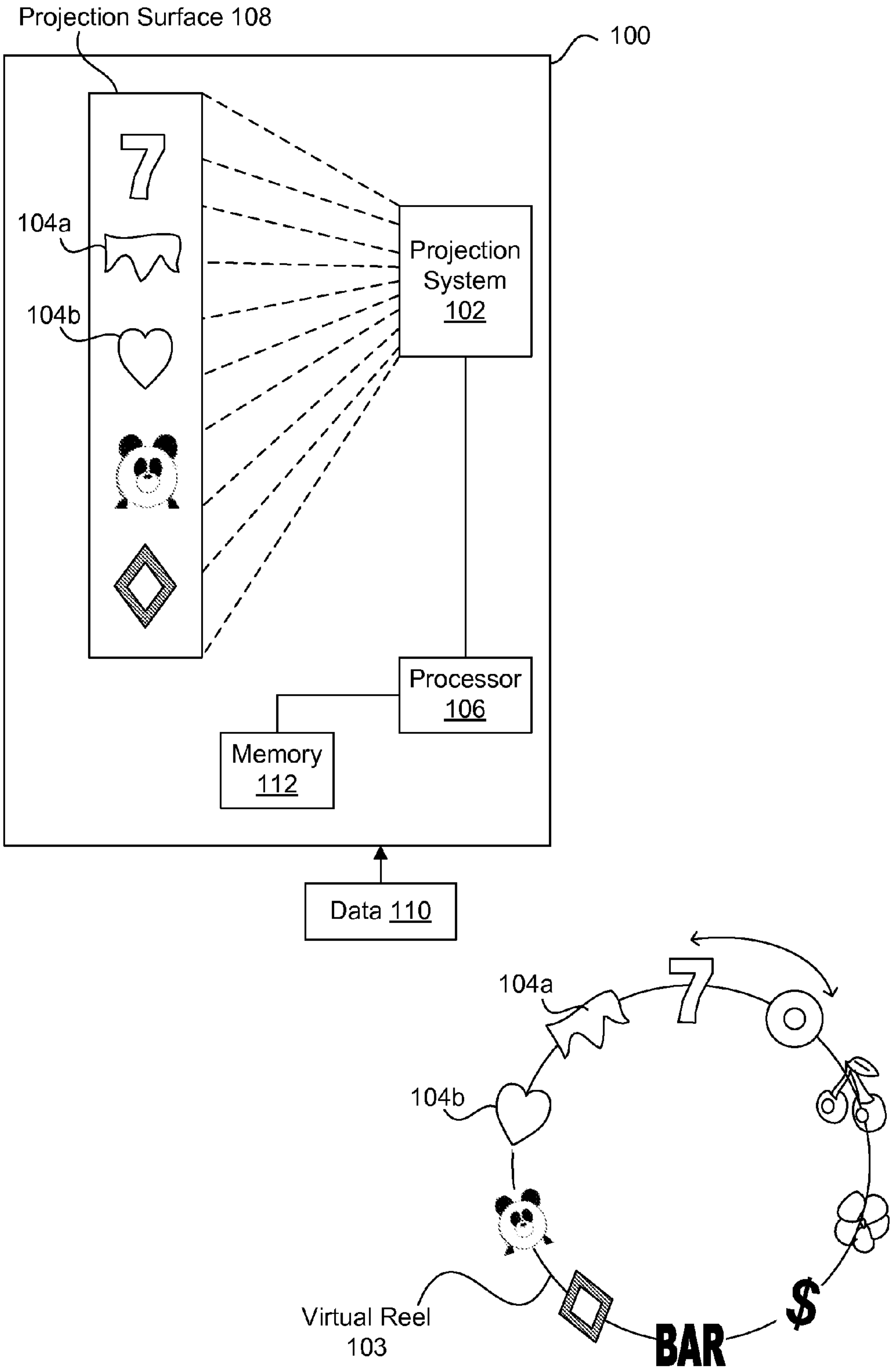
FIG. 1 depicts a gaming machine (unit) operable for playing a reel-based game in accordance with one embodiment of the invention.

As noted in the background section, virtual reels or reels with electro luminescent displays can be used to overcome some of the limitations of the conventional mechanical reel-based slot machines. However, virtual reels do not provide the look and feel of the like mechanical reels which is preferred by the players of traditional mechanical reel-based slot machines. Hence, a gaming machine with downloadable reels that can also provide the look and feel of mechanical reels would be useful. Furthermore, alternative techniques that do not use luminescent displays would be useful.

Accordingly, the invention pertains to techniques for simulating mechanical reels. The techniques are especially suitable for simulating mechanical reels typically used for reel-based games in conventional gaming machines (or units). It will be appreciate that mechanical reels can be simulated using a variety techniques including projection-based techniques and non-projection based techniques. The non-projection based techniques include displaying images on flat, bent, curved and/or flexible displays using, for example, Liquid Crystal Displays (LCD), Light Emitting Diode (LED) displays, Organic Light Emitting Diode (OLED) displays. Typically, projection-based techniques (e.g., Digital Light Processing) use a projector or projection engine to project images on flat, bent, curved and/or flexible surface. In any case, images can be displayed and/or projected on a stationary or a rotating display and/or projection surface. Projection techniques are discussed in more detail below. Those skilled in the art will appreciate that similar techniques can be used to display images on displays (e.g., LCD).

In accordance with one aspect of the invention, image of at least one rotating mechanical reel is projected on at least one projection surface to effectively simulate at least one mechanical reel. The image can be projected on multiple rotating projection surfaces (or reels) to give a closer illusion of a mechanical reel-based game. Projection can be accomplished by using a projection system coupled to one or more processors that processes projection data. Projection data can be downloaded and/or stored on a gaming machine. The projection data can effectively represent images to be projected on one or more projection surfaces. Projection can be synchronized with the rotation of projection surface as, for example, multiple projection reels rotate about the same horizontal axis (or X-axis). In addition to a projector (e.g., a DLP projector), the projection system can include one or more lenses and/or mirrors. A single projection system which is centrally located with respect to multiple projection reels can be used in accordance with one embodiment of the invention.

Further, a rotation mechanism (e.g., stepper motor, DC motor) can be configured about the periphery of a projection reels to externally drive (or rotate) a projection surface without interfering with the projection system. In addition to symbols projected on projection surfaces (e.g., rotating projection reels), the projection system can project virtual any other images including those used in a reel-based game (e.g., bet lines, score, credit), thereby allowing a dynamic environment where various components of the game can be quickly altered.

Embodiments of these aspects of the invention are discussed below with reference to FIGS. 1-11. However, those skilled in the art will readily appreciate that the detailed description given herein with respect to these figures is for explanatory purposes as the invention extends beyond these limited embodiments.

FIG. 1 depicts a gaming machine (unit) 100 operable for playing a reel-based game in accordance with one embodiment of the invention. Generally, a reel-based game can be played in connection with a plurality of images effectively provided by at least one virtual or mechanical reel. Referring to FIG. 1, a virtual reel 103 is shown with a plurality of images 104 (e.g., 104*a*, 104*b*) provided for playing a reel-based game. The gaming machine 100 effectively provides and/or implements the virtual reel 103 by displaying images 104 on a projection surface 108.

More particularly, a projection system 102 effectively projects the images 104 on the projection surface 108. It will be appreciated that the projected images can simulate rotation of a mechanical reel. Further, those skilled in the art will appreciate that the projection system 102 can, for example, be provided or include one or more hardware, software, and/or firmware components (or modules). Further, at least one processor 106 can be configured for the gaming machine 100. The processor 106 can, for example, be a general processor provided for general processing, or a dedicated and/or specialized processor provided primarily for the projection system 102. As such, the processor 106 can effectively be a part of the projection system 102 or a separate component. In any case, the processor 106 can process data 110 representative of the images 104. Data 110 can, for example, be stored in internal memory 112 and/or received via wired and/or wireless transmission from a server (or host), and/or controller device. In any case, a representative of the images 104 is processed and projected by the projecting system 102.

In any case, the projected images 104 can be used to implement a reel-based game. In other words, the projection system 102 can be configured to project images 104 on the projection surface 108 when the gaming machine 100 is operable for playing the reel-based game. Moreover, it will be appreciated that the projection system 102 can be further configured to display the images 104 in a manner that effectively simulates or mimics a rotating mechanical reel provided by a conventional mechanical reel-based gaming machine. In other words, the projection system 102 can be configured to project images 104 on the projection surface 108 to effectively simulate or mimic the rotation of a mechanical reel with images 104 affixed to its surface. The images can be used to determine and/or display the outcome for a reel-based game. By way of example, the projection system 102 can effectively simulate rotation of the virtual reel 103 about the horizon (or X-axis) in a clockwise and/or counter clockwise manner. The speed and/or acceleration of the apparent rotation may effectively mimic rotation of a mechanical reel and/or reels configure for conventional gaming machines. This rotation may eventually or abruptly end to display one or more images (e.g., 104*a*, 104*b*) on the projection surface 108 in order to determine and/or display the outcome of a reel-based game (e.g., displaying the image 104*a* and/or 104*b* in a particular location can signify a win). It should be noted that the projection surface 108 can be shaped like a mechanical reel and/or effectively provided by an object shaped like a mechanical reel in order to more closely simulate or mimic rotation of a mechanical reel configured for a conventional reel-based gaming machine. In addition, the projection surface 108 can effectively rotate like a mechanical reel to give a better look and feel of a mechanical device.

Figure 2:
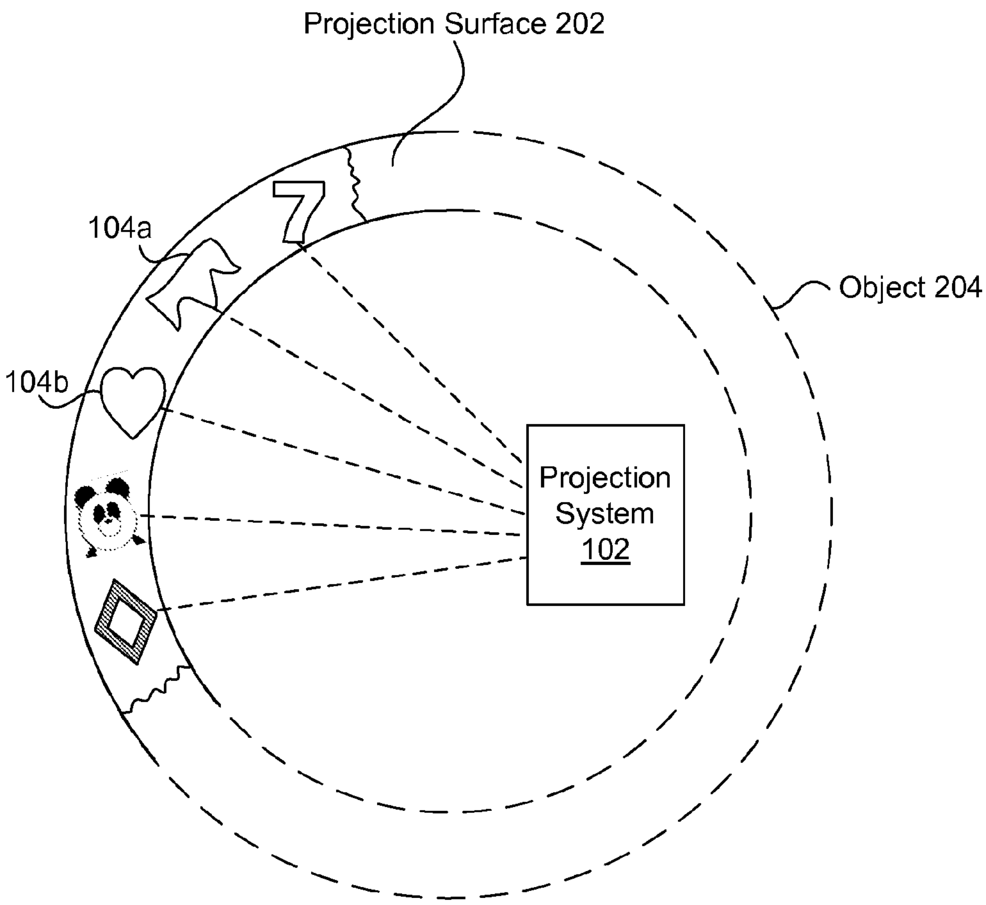
FIG. 2 depicts a projection surface in accordance with one embodiment of the invention.

Referring now to FIG. 2, a projection surface 202 is depicted in accordance with one embodiment of the invention. The projection surface 202 can, for example, be effectively provided by an object 204 which is shaped as or like a mechanical reel. It should be noted that object 204 can, for example, be provided as a projection reel configured to rotate about its X and/or Y axis. The projection surface 202 can include a bent-surface representing a frontal surface of a mechanical reel that would be visible to a human eye.

Figure 3:
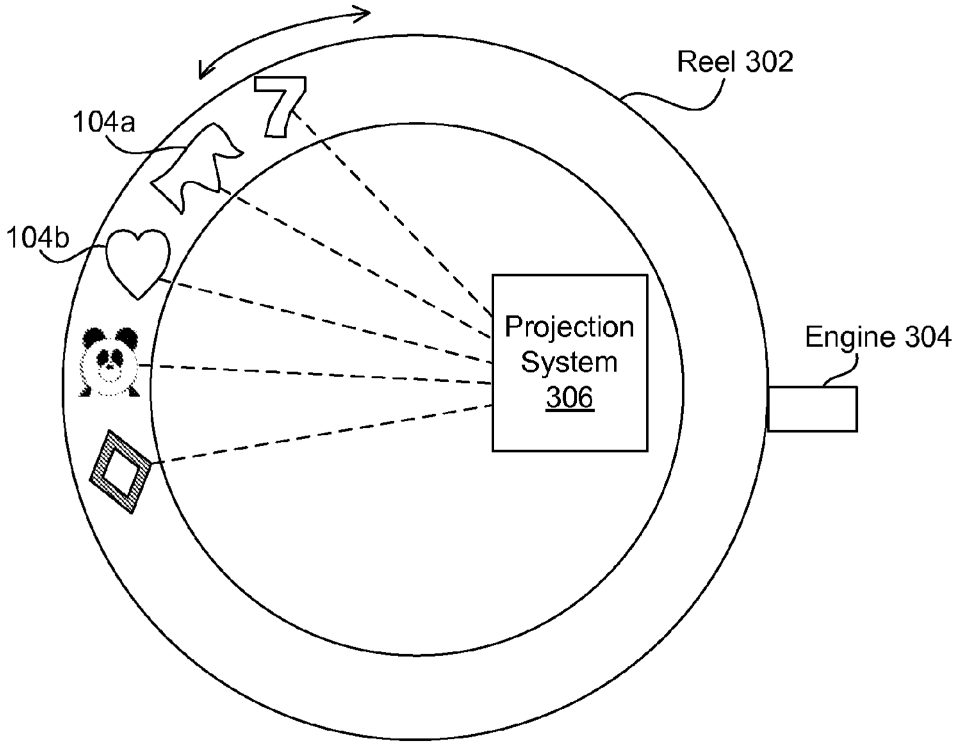
FIG. 3 depicts a projection reel configured to rotate about a horizontal axis in a clockwise and/or counter-clockwise manner in accordance with one embodiment of the invention.

To further elaborate, FIG. 3 depicts a projection reel 302 configured to rotate about a horizontal axis (or X axis) in a clockwise and/or counter-clockwise manner in accordance with one embodiment of the invention. As will be discussed in greater detail, an engine 304 can effectively rotate the reel 302. It will be appreciated that the engine 304 can effectively rotate the projection reel 302. The engine 304 can be configured to allow rotation of the reel 302 without interfering with the projection system 306. The engine 304 can, for example, be configured externally with respect to the projection reel 302 for rotation about an X axis (e.g., an externally driven stepper motor or DC motor). Typically, at least a portion of the projection surface of the projection reel 302 which is used to project images 104 is visible to a human eye when a game is being played. In the projection reel 302 or at least the portion of it can, for example, be made of glass or similar material suitable for projection of images 104. In order to more effectively simulate or mimic game play on a conventional gaming machine that employs mechanical reels, the projection reel 302 can rotate during game play, thereby providing the look, feel and sound of a conventional gaming machine which uses a mechanical reel with images affixed to its surface. More popular gaming machines use a plurality of reels. As such, a plurality of projection reels 302, objects 204 (shown in FIG. 2), and/or projection surfaces 108 (shown in FIG. 1) can be configured for a gaming machine.

Figure 4:
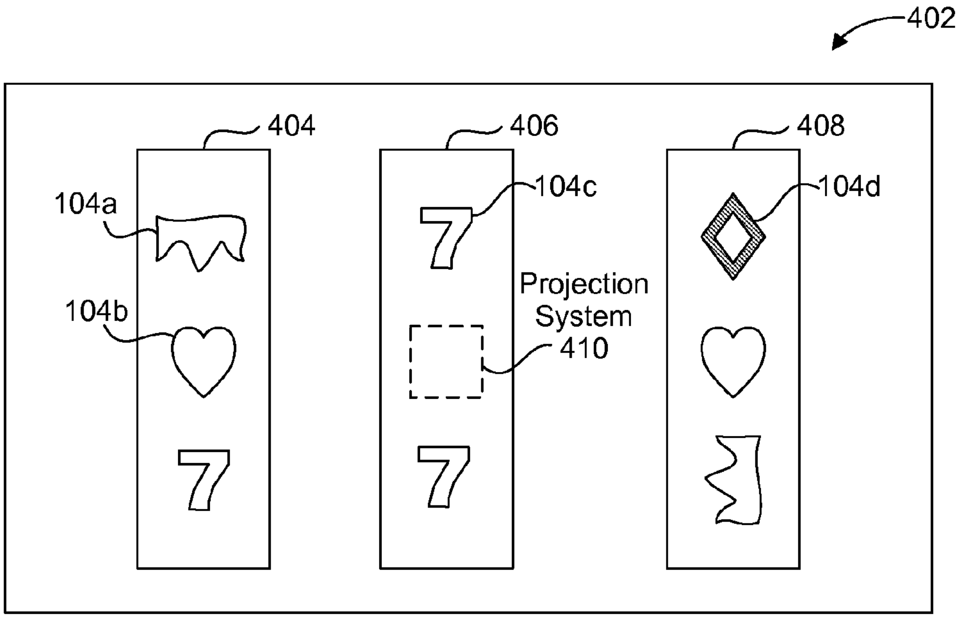
FIG. 4 depicts a configuration of projection surfaces suitable for implementing a reel-based game in accordance with one embodiment of the invention.

To further elaborate, FIG. 4 depicts a configuration 402 of projection surfaces suitable for implementing a reel-based game in accordance with one embodiment of the invention. Referring to FIG. 4, three (3) projection surfaces 404, 406 and 408 are configured in a configuration 402 which can, for example, be provided for a gaming machine. Each of the projection surfaces can, for example, be a projection reel (e.g., projection reel 302). The configuration 402 can be viewed via a window (e.g., glass window) provided for the gaming machine. It should be noted that a projection system 410 is configured at a central location with respect to the projection surfaces 404, 406 and 408. It should also be noted that each of the projection surfaces (404, 406 and 408) can, for example, be shaped as or like a mechanical reel (e.g., projection surface 202 shown in FIG. 2) and/or effectively provided by a projection surface that rotates reel (e.g., reel 302 shown in FIG. 3). As such, it will be appreciated that each of the projection surfaces 404, 406 and 408 can be provided by a projection reel configured to rotate, similar to a conventional reel, in accordance with one embodiment of the invention. As the reels rotate during game play, the projection system 410 projects images (e.g., 104) effectively on each of the projection surfaces 404, 406 and 408. These images would be visible to a human eye to effectively simulate or mimic rotation of three (3) mechanical reels with images affixed to them.

It will be appreciated that the rotation of projection surfaces or reels (404, 406 and 408) reels would enhance the simulation of conventional mechanical reels by allowing the look, feel, and sound of a traditional game to be more closely replicated. Those skilled in the art will also appreciate that a single projector provided by the projection system 410 may be more cost-effective given the current costs associated with suitable projectors that can be configured for a gaming machine and can support a configuration of multiple projection surfaces. However, it should be noted that multiple projectors can be configured such that, for example, a projector is provided for each one of the projection surfaces and/or reels that are provided to play a reel-based game. Further, this and other alternative configurations may even be more desirable for certain situations and/or prove to be even more cost effective in the future.

Figure 5:
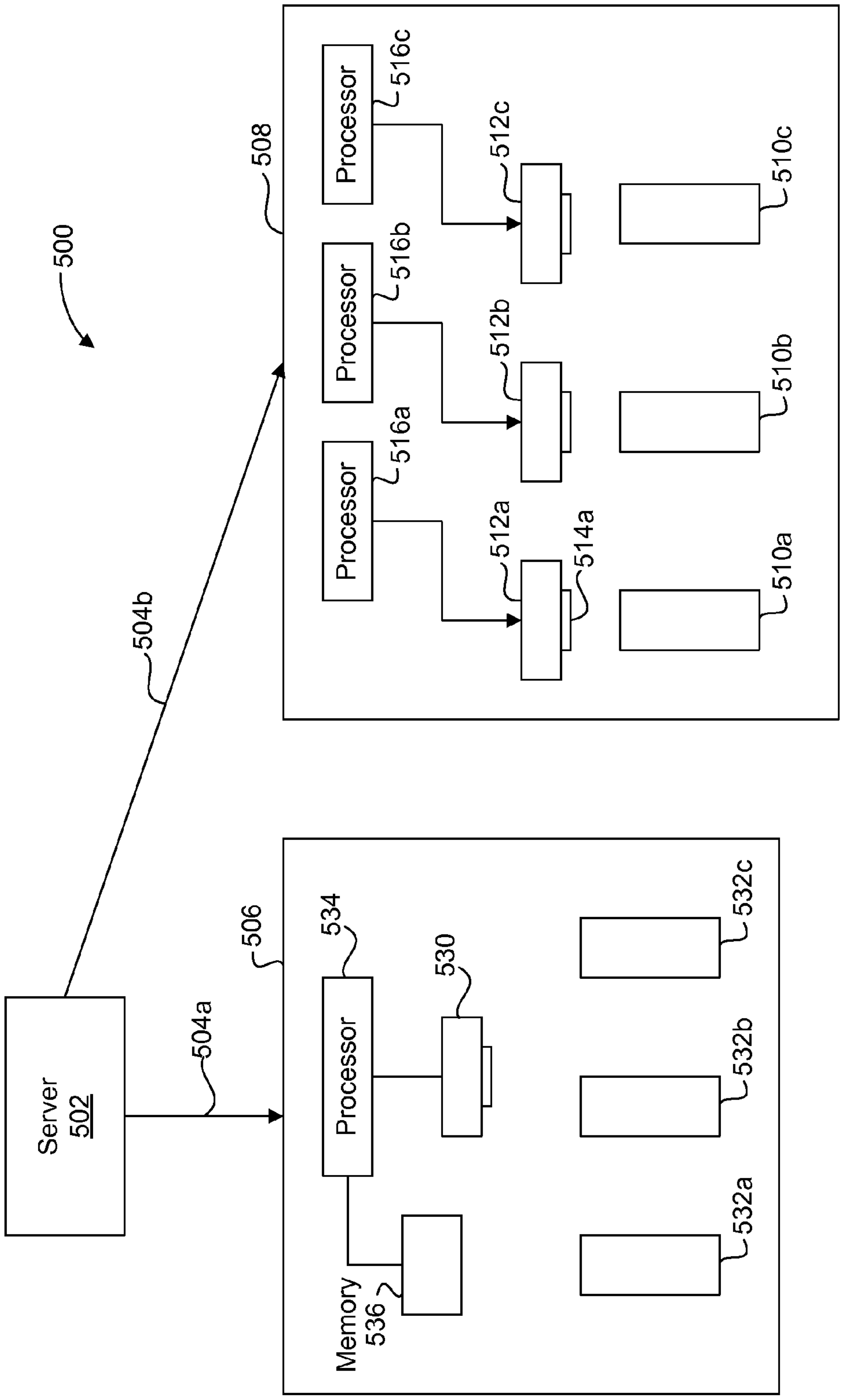
FIG. 5 depicts a gaming environment in accordance with one embodiment of the invention.

To further elaborate, FIG. 5 depicts a gaming environment 500 in accordance with one embodiment of the invention. Referring to FIG. 5, a server 502 communicates via wired and/or wireless connections 504 with gaming machines 506 and 508. For each one of the three (3) projection surfaces (e.g., projection reels configured to rotate) 510*a*, 510*b* and 510*c*, a separate projector and lens configuration is provided as a separate projection system. More particularly, projectors 512*a*, 512*b* and 512*c* are provided respectively for projection surfaces 510*a*, 510*b* and 510*c*. In addition, a lens is provided for each projector from projection images on a corresponding projection surface. In other words, a lens 514*a* is provided for projection of images on the projection surface 514*a*, and so on. In addition, a dedicated and/or specialized processor may be configured for each one of the projectors 512*a*, 512*b* and 512*c*. Referring to FIG. 5, a processor 516*a* is configured for the projector 512*a* and used to process data in order to facilitate projection of images on the projection surface 510*a*, and so on. This data can, for example, be transmitted by the server 502 to the gaming machine 508 and/or stored locally by the gaming machine 508. Subsequently, the data can be processed by one or more of the processors 516*a*, 516*b* and 516*c*. Hence, the server 502 can effectively synchronize projection of images on the projection surfaces 510*a*, 510*b* and 510*c*. On the other hand, a single projector 530 is configured for the gaming machine 506 to effectively project images on multiple projection surfaces 532*a*, 532*b* and 532*c*. As shown in FIG. 5, a single processor 534 is provided to process data used for projection of images on the projection surfaces 532*a*, 532*b* and 532*c*. This data can be transmitted by the server 502 and/or stored in memory 536 which is local to the gaming machine 506. It should be noted that data can also be stored in memory provided for the gaming machine 508 (not shown). Further, although not shown in FIG. 5, an additional processor (or a central processor) can, for example, be configured for the gaming machine 508 to effectively coordinate between the processors and/or synchronize projection of images on the projection surfaces without requiring the server 502 to synchronize projection and/or provide any data.

Figure 6:
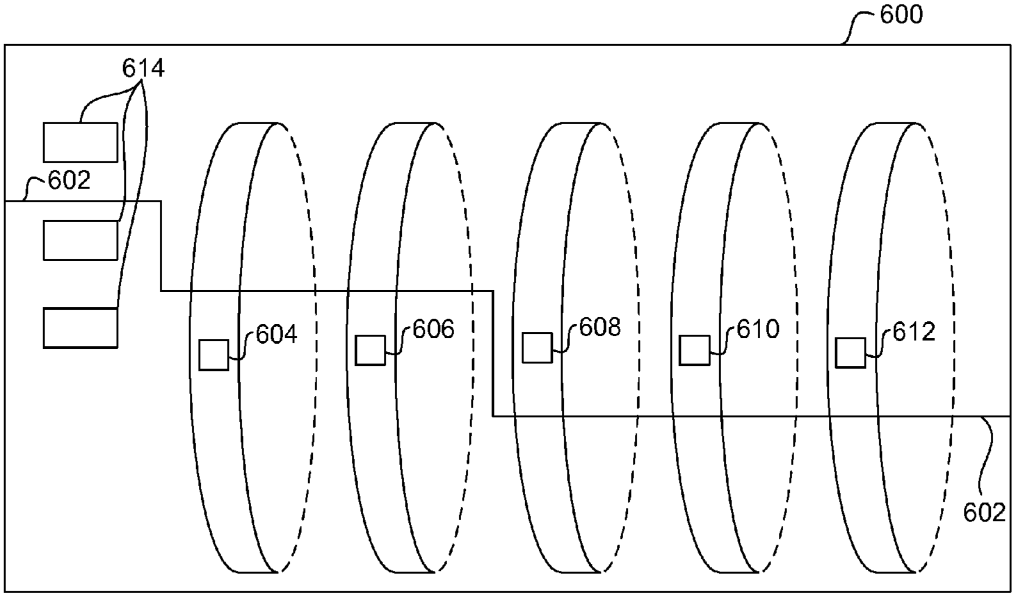
FIG. 6 depicts an exemplary display (or window) in accordance with one embodiment of the invention.

In addition to projecting images (e.g., symbols) associated with a reel, a projector or projection system can be used to project various other images including other images which are useful for playing a reel-based game (e.g., bet-lines, game-indicators, such as, credit left, current bet). By way of example, FIG. 6 depicts an exemplary display (or window) 600 in accordance with one embodiment of the invention. Display (or window) 600 can, for example, be configured for a gaming machine operable for playing a reel-based game. Referring to FIG. 6, a bet-line 602 can be effectively projected by a projector 608 centrally located, or by one or more projectors 604, 606, 608, 610 and 612. The bet-line 602 can, for example, be projected based on input provided by a human (or player) when a gaming machine is operable for playing a reel-based game. In addition to the bet-line 602, one or more indicators 614 can be projected on the display (or window) 600 and updated accordingly. The indicators 614 can be projected by the projector 608 and/or one or more other projectors (e.g., projector 604). An indicator 614 can, for example, indicate the number of credits available as a game is in progress, current bet and so on. It will be appreciated that unlike traditional gaming machines, the position of the indicators 614 need not be fixed on the window 600. Also, bet-line 602 can be displayed in a dynamic manner on the display 600. Hence, a more flexible and dynamic gaming environment can be realized.

Those skilled in the art will appreciate that several technical challenges need to be addressed in order to provide a projection system that can effectively simulate or mimic a traditional reel-based game using mechanical reels. One technical challenge is to rotate the projection reels in a manner that does not interfere with the projection system. As such, conventional mechanisms for rotating a reel may be undesirable as an internally driven mechanism (e.g., reel supported by a central shaft) can interfere with the projection mechanism. To address this problem, an externally driven rotation mechanism (e.g., a stepper motor, a DC motor) can be provided. Generally speaking, projection of images onto a rotating surface or reel presents additional technical challenges. More particularly, projection becomes more difficult as the number of projection surfaces (or reels) increases and each projection surface becomes relatively narrower. To further elaborate, a configuration of five (5) reels is described below in greater detail in accordance with one embodiment of the invention.

Figure 7A:
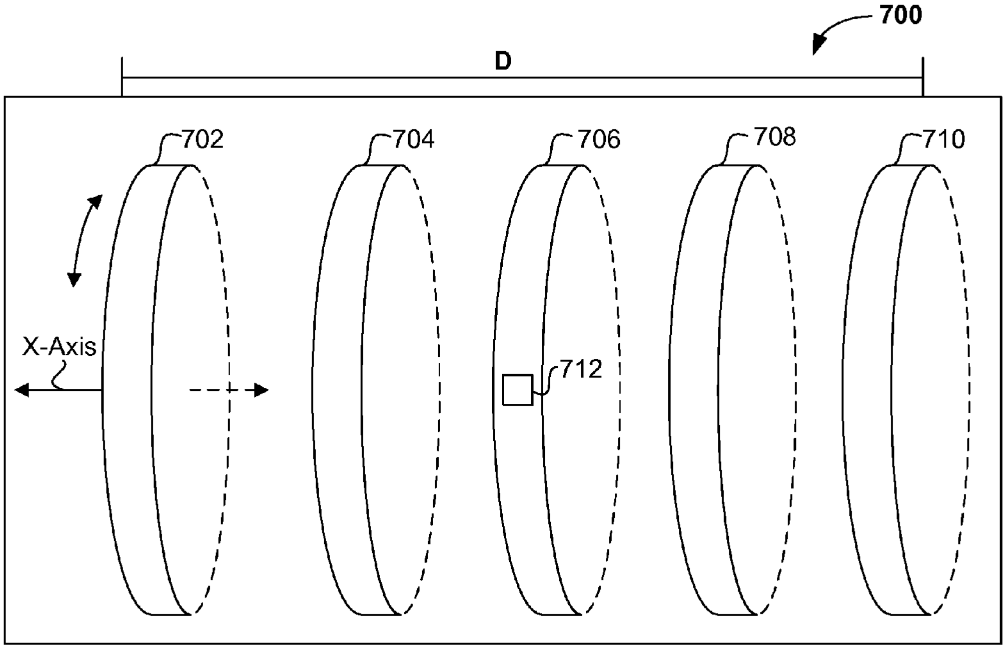
FIG. 7A, conceptually depicts a configuration of five (5) projection reels in accordance with one embodiment of the invention.

Referring to FIG. 7A, a configuration 700 of five (5) projection reels is conceptually depicted in accordance with one embodiment of the invention. Each of the projection reels 702, 704, 706, 708 and 710 is configured to rotate over an X-axis. A projection system 712 is located in a central location with respect to the projection reels. The distance D indicates the span of the projection reels from end to end. This distance (D) can, for example, extend from about 12 to about 20 inches in order to more closely replicate traditional reel-based games with five (5) reels. In such a configuration, the width of each projection reel can be about 2 to about 4 inches. FIG. 7E shows a similar arrangement in which reels 702, 704, 706, 708 and 710 are configured to rotate about a vertical axis (Y-axis).

Figure 7C:
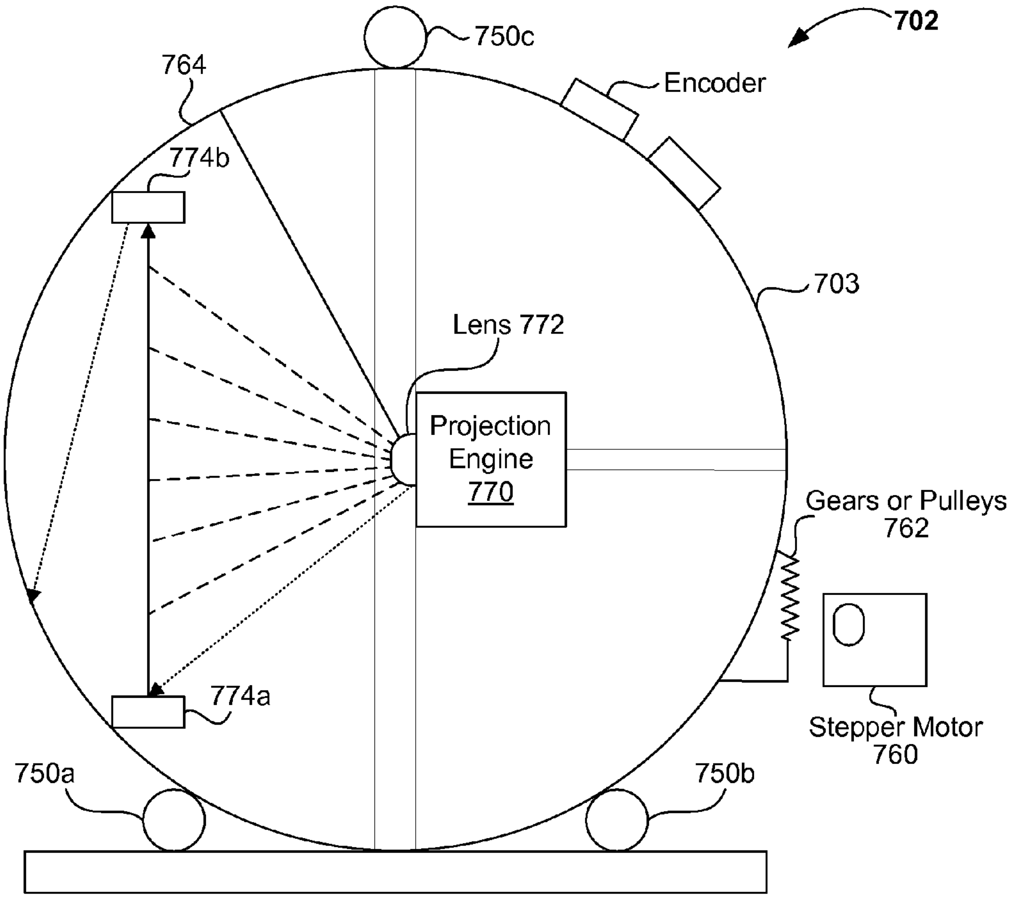
FIG. 7C depicts a projection reel configuration in accordance with another embodiment of the invention.
Figure 7D:
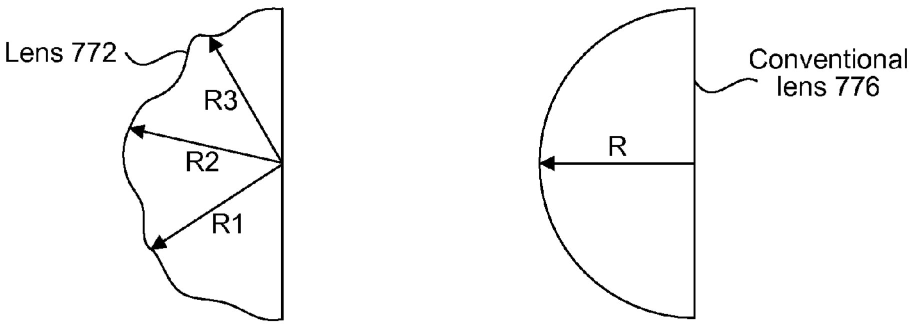
FIG. 7D conceptually depicts a lens in accordance with one embodiment of the invention.
Figure 7E:
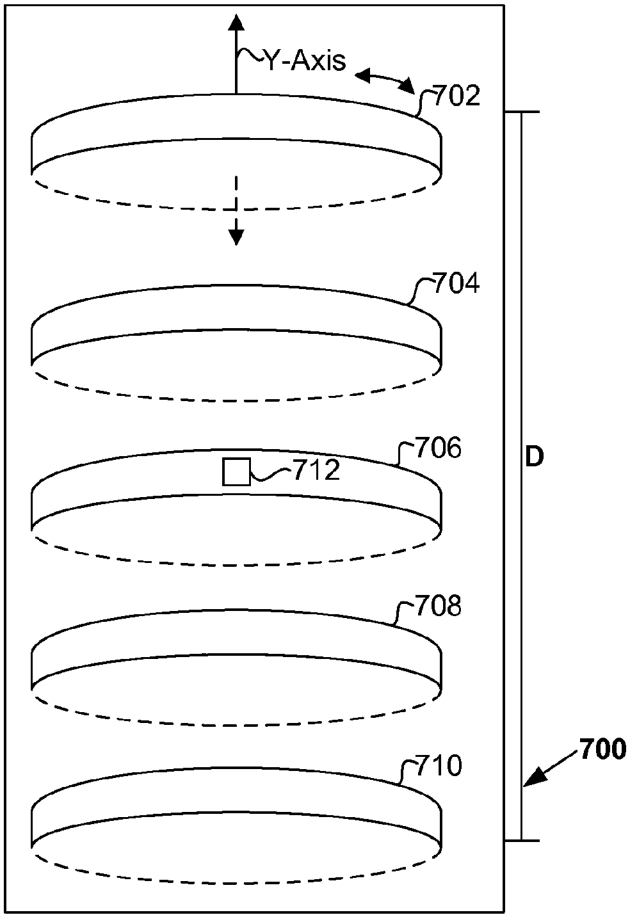
FIG. 7E, conceptually depicts a configuration of five (5) projection reels in accordance with one embodiment of the invention.
Figure 7B:
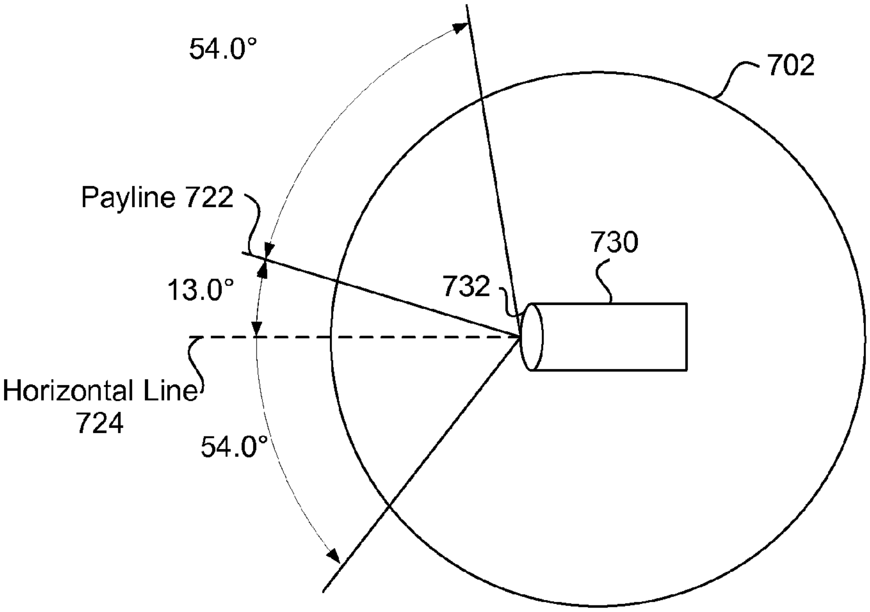
FIG. 7B depicts a projection reel in accordance with one embodiment of the invention.

FIG. 7B depicts a projection reel 702 in accordance with one embodiment of the invention. Referring to FIG. 7B, a pay-line 722 is about 13.05° (degrees) from a horizontal line 724 drawn through the center of the projection reel. Generally, images can be projected beyond an area invisible to a person (or player). As suggested by FIG. 7B, projected images can extend about 54° (degrees) both above and below the pay-line 722 in accordance with one embodiment of the invention. However, several other configurations can be used. For example, projected images can extend about 40.3° below the pay-line while projecting images 540 (degrees) above the pay-line. It should also be noted that images are projected by a projector 730 via a lens 732. In addition, mirrors (not shown) can be used to effectively project images on a rotating reel.

To further elaborate, FIG. 7C depicts a projection reel configuration 702 in accordance with another embodiment of the invention. Referring to FIG. 7C, bearings (or support blocks) 750 are provided to support rotation of the projection reel 703. A stepper motor (or DC motor) engages a series of gears, pulleys, or friction wheels 762 to effectively rotate the projection reel 764 around its X-axis. A projection engine 770 and lens 772 are configured to effectively project images on the surface of the projection reel 703 as it rotates or in a stationary position. Those skilled in the art will appreciate that mirrors 774 can also be used in some configurations to effectively reflect images that are projected on the of the projection reel 703. However, it should be noted that use of mirrors 772 is not necessary.

Those skilled in the art will also appreciate that the projection engine 770 can, for example, be a Digital Light Processing (DLP) engine. As such, any DLP projection material can be used for projection of images on the surface of the projection reel 703. DLP technology is generally known to those skilled in the art. It should be noted that other projection technologies can be used. One such technology is generally known as LCos (Liquid Crystal on silicon) which can effectively create images using a stationary mirror mounted on the surface of a chip and using a liquid crystal matrix to control how much light is reflected. In order to project over a relatively larger area (e.g., 14.5 inches) spanning multiple wheels (e.g., 5 or more), lens 772 can be utilized to effectively project images on relatively thinner surfaces of each of the reels. Those skilled in the art will also appreciate that the lens 772 may differ form a conventional lens.

Figure 7F:
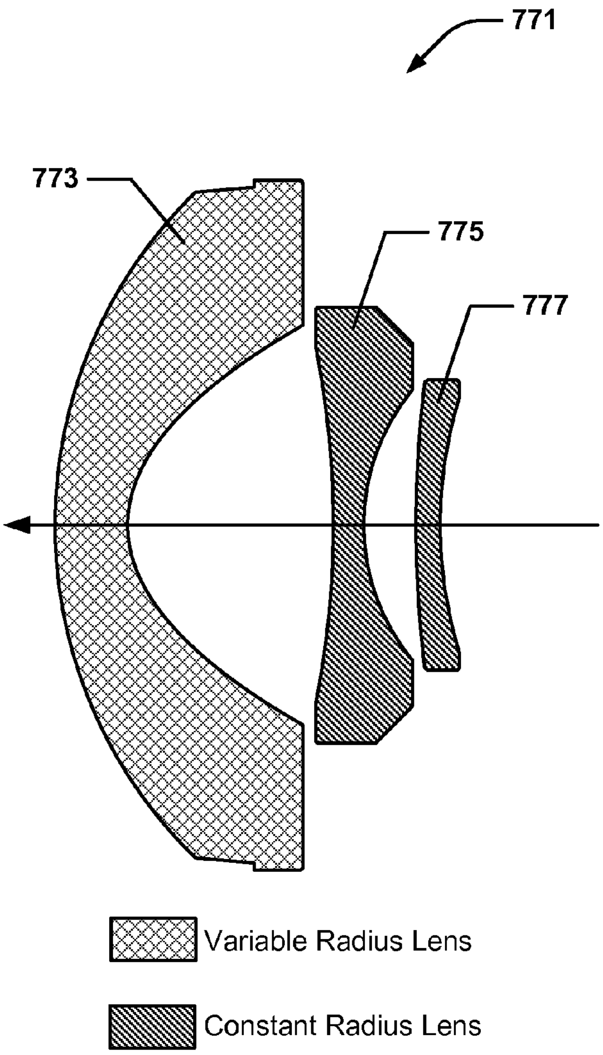
FIG. 7F depicts an example of a lens system with constant and variable radius lenses in accordance with another embodiment of the invention.

To further elaborate, FIG. 7D conceptually depicts a lens 772 in accordance with one embodiment of the invention. Referring to FIG. 7D, a conventional lens 776 is also depicted with a constant radius R. On the other hand, lens 772 is depicted with a variable radius (R1, R2 R3). FIG. 7F conceptually depicts lens system 771 with one or more lenses including both variable radius lens 773 and constant-radius lenses 775 and 777. It should be noted that other techniques can be utilized to achieve the effects of a lens with a variable radius lens 772. For example, those skilled in the art will appreciate that "pixel-warping" can be utilized to achieve the desired effect using a conventional lens 776. Pixel-warping can be achieved by digitally manipulating pixels, for example, by using a Silicon Optics Pixel Warping chip. In any case, images can be projected by the projection engine (e.g., DLP engine) 770 through the lens 772, reflected by the mirrors 774, and displayed on the surface of the projection reel 702.

Figure 8:
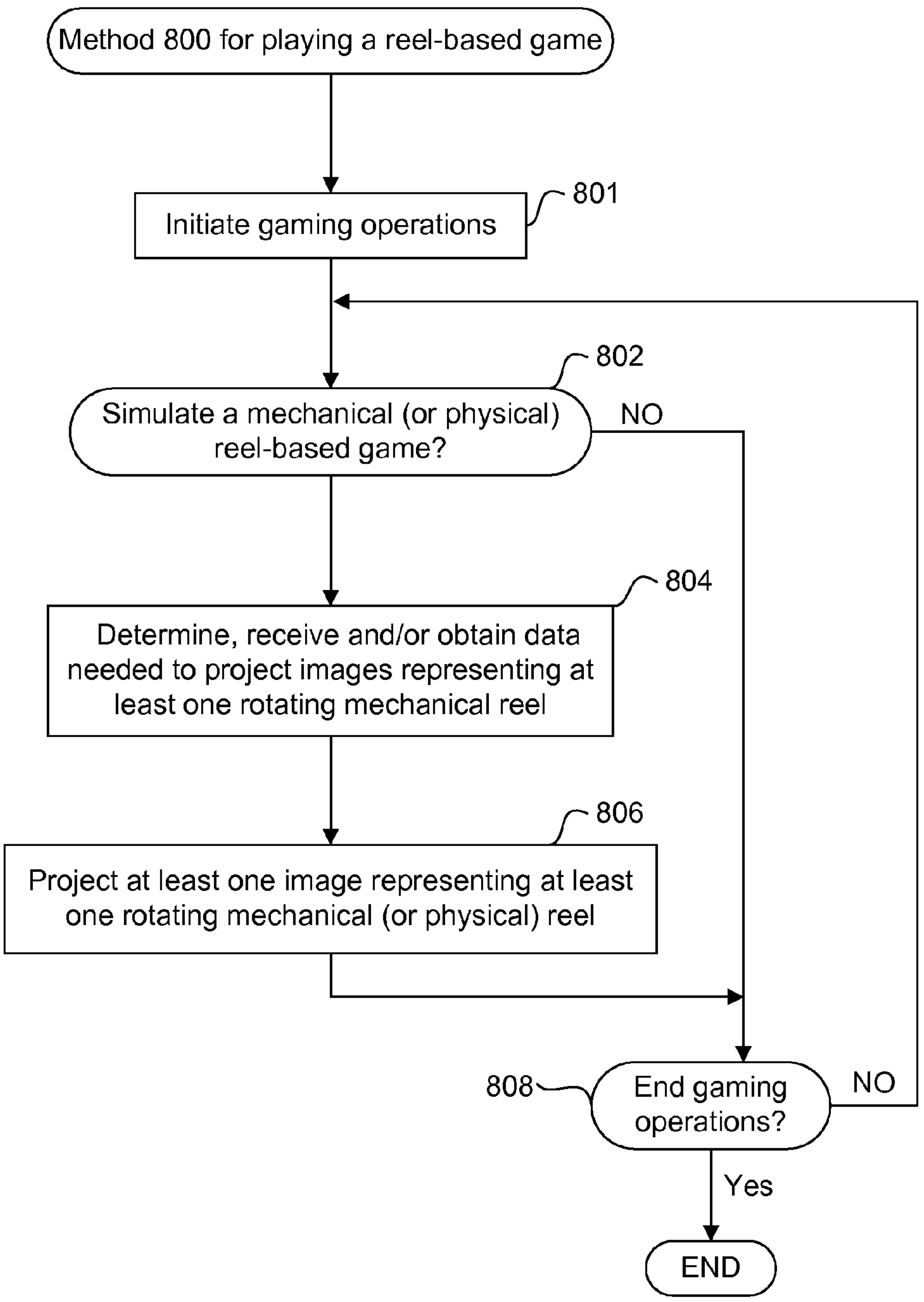
FIG. 8 depicts a method for playing a reel-based game in accordance with one embodiment of the invention.

FIG. 8 depicts a method 800 for playing a reel-based game in accordance with one embodiment of the invention. The method 800 can, for example, be used by a gaming machine (or unit) operable for playing a reel-based game in connection with a plurality of images. Conventionally, these images would be affixed to a mechanical reel configured to rotate during game play. Typically, a plurality of reels is provided to play a traditional reel-based game. Initially, gaming operations are initiated (801). By way of example, a gaming machine is started up for playing a reel-based game. Next, it is determined (802) whether to simulate a mechanical (or physical) reel-based game. In other words, it is determined (802) whether to simulate game play on a traditional reel-based game where mechanical reels with images affixed to them are used to determine and/or display the outcome of the reel-based game. By way of example, it can be determined (802) where the input has been received that effectively requests or indicates to start a game. If it is determined (802) not to simulate a mechanical reel-based game, it is determined (808) whether to end gaming operations and the method 800 can end accordingly. On the other hand, if it is determined (808) not to end the gaming operations, it is determined (802) whether to simulate a mechanical (or physical) reel-based game. In effect, the method 800 can wait until it is determined (802) to simulate a mechanical reel-based game or it is determined (808) to end gaming operations.

If it is determined (802) to simulate a mechanical reel-based game, data needed to project the images representing at least one rotating mechanical reel is determined, received and/or obtained (804). This data can, for example, be downloaded from a server to a gaming machine and/or retrieved from a local storage on a gaming machine. In any case, the data is used to project (806) at least one image representing at least one rotating mechanical reel. The projected image can effectively simulate at least one rotating mechanical reel with images affixed to it, thereby providing the look, feel and sound of a conventional reel-based game simulating rotation of a mechanical reel-based game. The image can, for example, be projected on a rotating projection reel or on a stationary surface shaped like a portion of a mechanical reel that would be viewable to a person playing the reel-based game. After the images are projected (806), it is determined (808) whether to end the gaming operations. If it is determined (808) not to end the gaming operations, it is determined (802) whether to simulate a mechanical reel-based game. As such, the method 800 can proceed in a similar manner as described above to project image(s) 806 and effectively simulate another instance of a game played on a traditional reel-based game. The method 800 ends when it is determined (808) to end the gaming operations (e.g., when it is determined to turn off or shut down the gaming operations based on input provided by an operator and/or administrator).

Figure 9:
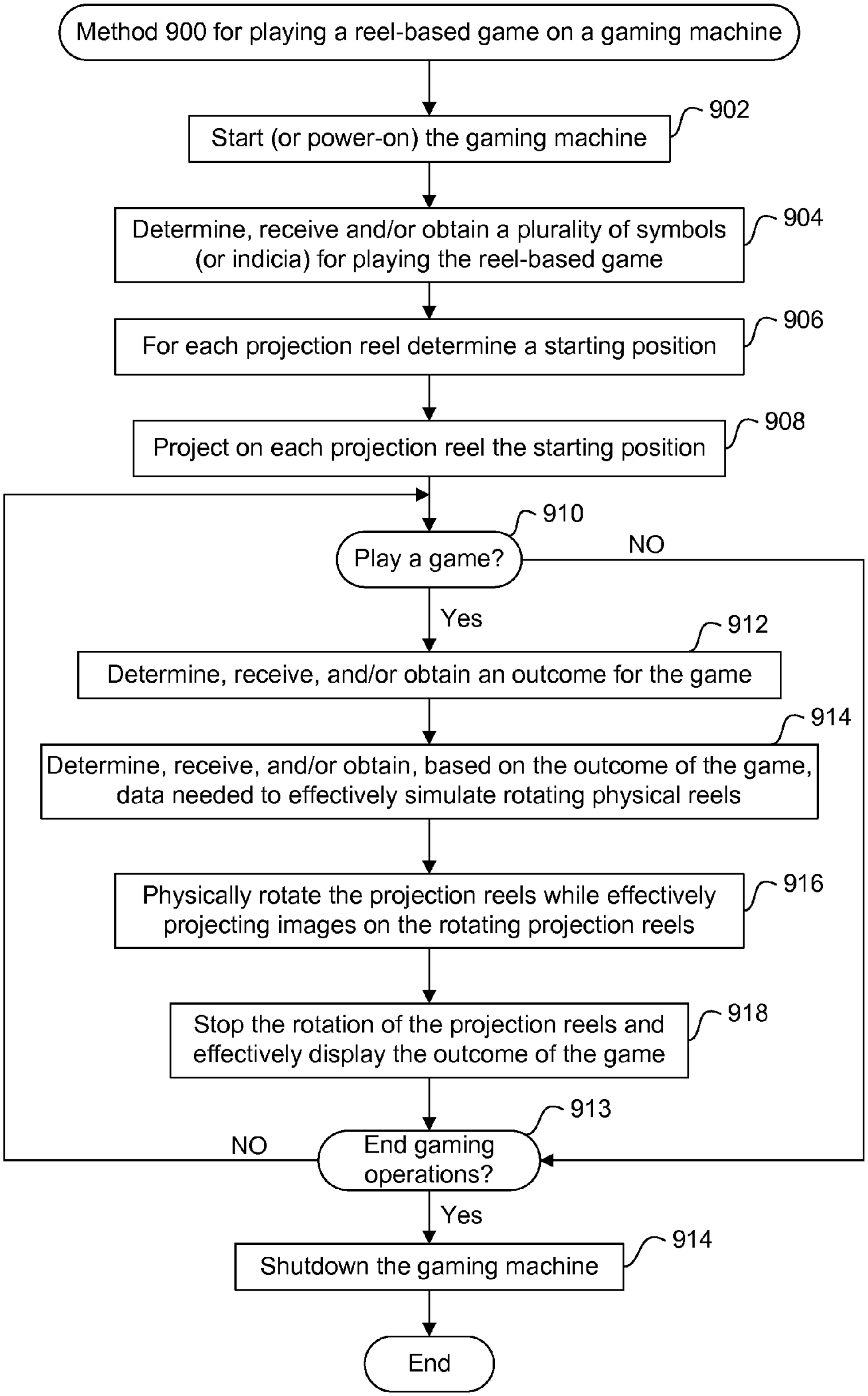
FIG. 9 depicts a method for playing a reel-based game on a gaming machine in accordance with one embodiment of the invention.

FIG. 9 depicts a method 900 for playing a reel-based game on a gaming machine in accordance with one embodiment of the invention. Initially, the gaming machine is started (or powered-on) 902. Next, a plurality of symbols (or indicia) are determined, received and/or obtained (904). Similar to a traditional reel-based game, the symbols can be used to effectively provide a plurality of reels for playing the reel-based game. The symbols can, for example, be downloaded from a server and/or obtained from a local storage on the gaming machine. Based on the symbols, a starting position is determined (906) for each projection reel configured for the gaming machine. Accordingly, the starting position is projected (908) on each projection reel. As such, one or more symbols can be projected on each projection reel. Typically, the projection reels are initially in a stationary starting position (i.e., not rotating). After the starting position is projected (908), it is determined (910) whether to play a game (or instance of the reel-based game). If it is determined (910) not to play the game, it is determined (912) whether to end the gaming operations. As such, the gaming machine can be shutdown and the method 900 can end accordingly. However, if it is determined (912) not to end the gaming operations, it is determined (913) whether to play a game. In effect, the method 900 can wait for a determination (910) that indicates to play the game or a determination (912) can end the gaming operations. By way of example, a person (or player) can effectively request the game to be played (e.g., by pressing a button).

If it is determined (910) to play a game, an outcome for the game is determined, received and/or obtained (912). The outcome of the game can, for example, be determined by the gaming machine and/or by a server machine. In any case, data needed to effectively simulate rotation of mechanical reels is determined, received and/or obtained (914). This data can, for example, be determined by a server and/or the gaming machine. Typically, the data is based on the outcome of the game. The data can include and/or effectively represent one or more symbols to be displayed for the outcome. It should be noted that the projection reels are mechanically rotated (916) while images are projected on them to provide the visual effect of mechanical reels that are rotating. In other words, the rotation of the projection reels is coordinated with the projected images to give the illusion of rotating mechanical reels. Subsequently, the rotation of the projection reels is stopped and the outcome is effectively displayed (918) on the projection reels. In other words, the outcome is projected on the projection reels. Thereafter, it is determined (912) whether to end the gaming operations. By way of example, based on the input provided by a player, operator, and/or administrator, it can be determined (912) to end the gaming operations and the gaming machine can be shutdown (914). The method 900 ends after the gaming machine has been shutdown (914). On the other hand, if it is determined not to end the gaming operation, it is determined (910) whether to play a game. If it is determined (910) to play a game, the method 900 can proceed in a similar manner as discussed above to effectively simulate a traditional reel-based game. The method 900 ends if it is determined (912) to end the gaming operations.

Figure 10:
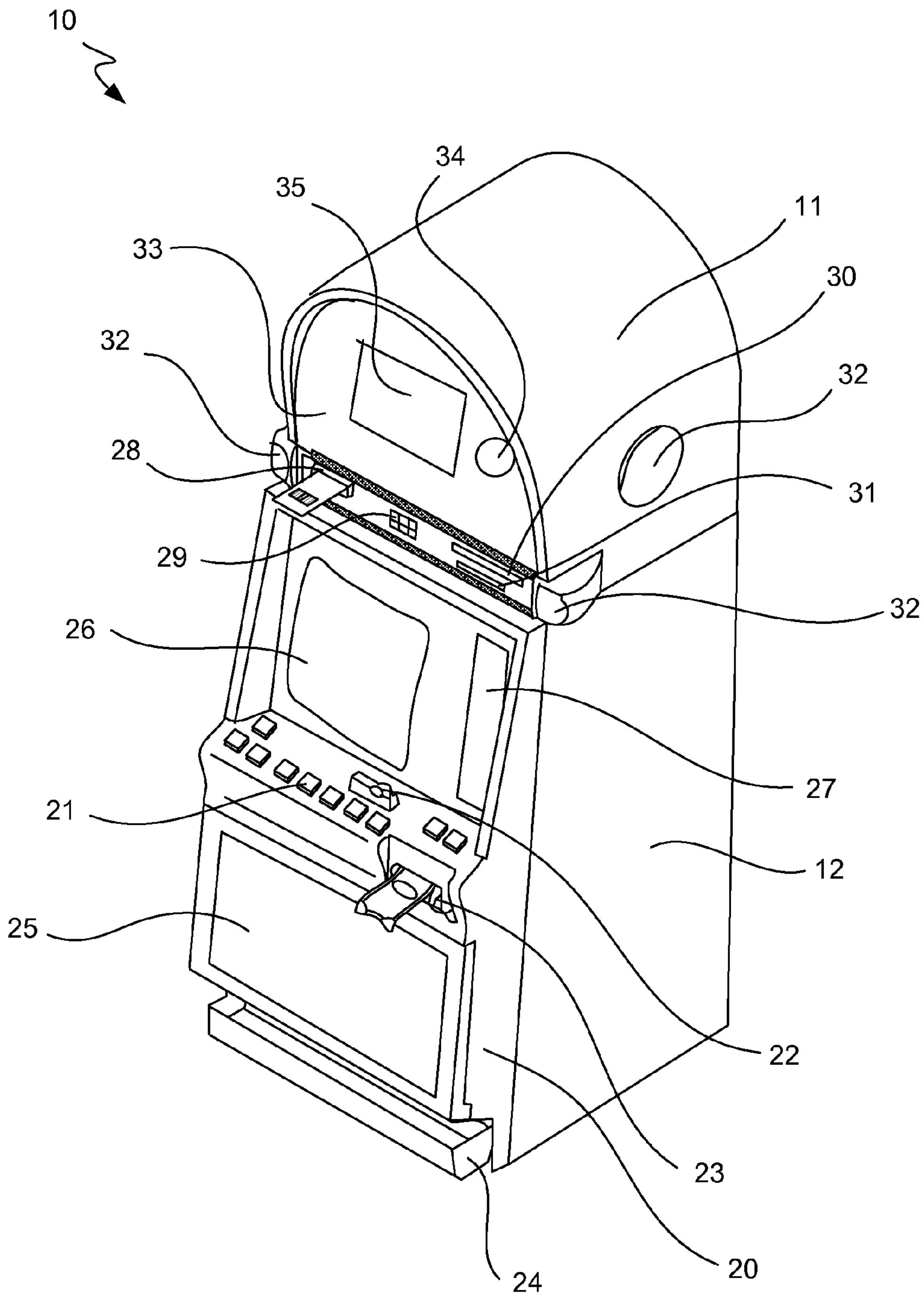
FIG. 10 illustrates in perspective view an exemplary gaming machine.

Referring to FIG. 10, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket dispenser 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 10, and it is specifically contemplated that the present invention can be used in conjunction with such a gaming machine or device that might encompass any or all such additional types of features and functions. One item that is specifically contemplated for use with the present invention involves a gaming machine that incorporates a reusable cashless instrument feature, such as a reusable cashless instrument issuing device and/or a reusable cashless instrument reading device.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage-monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security-monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

Figure 11:
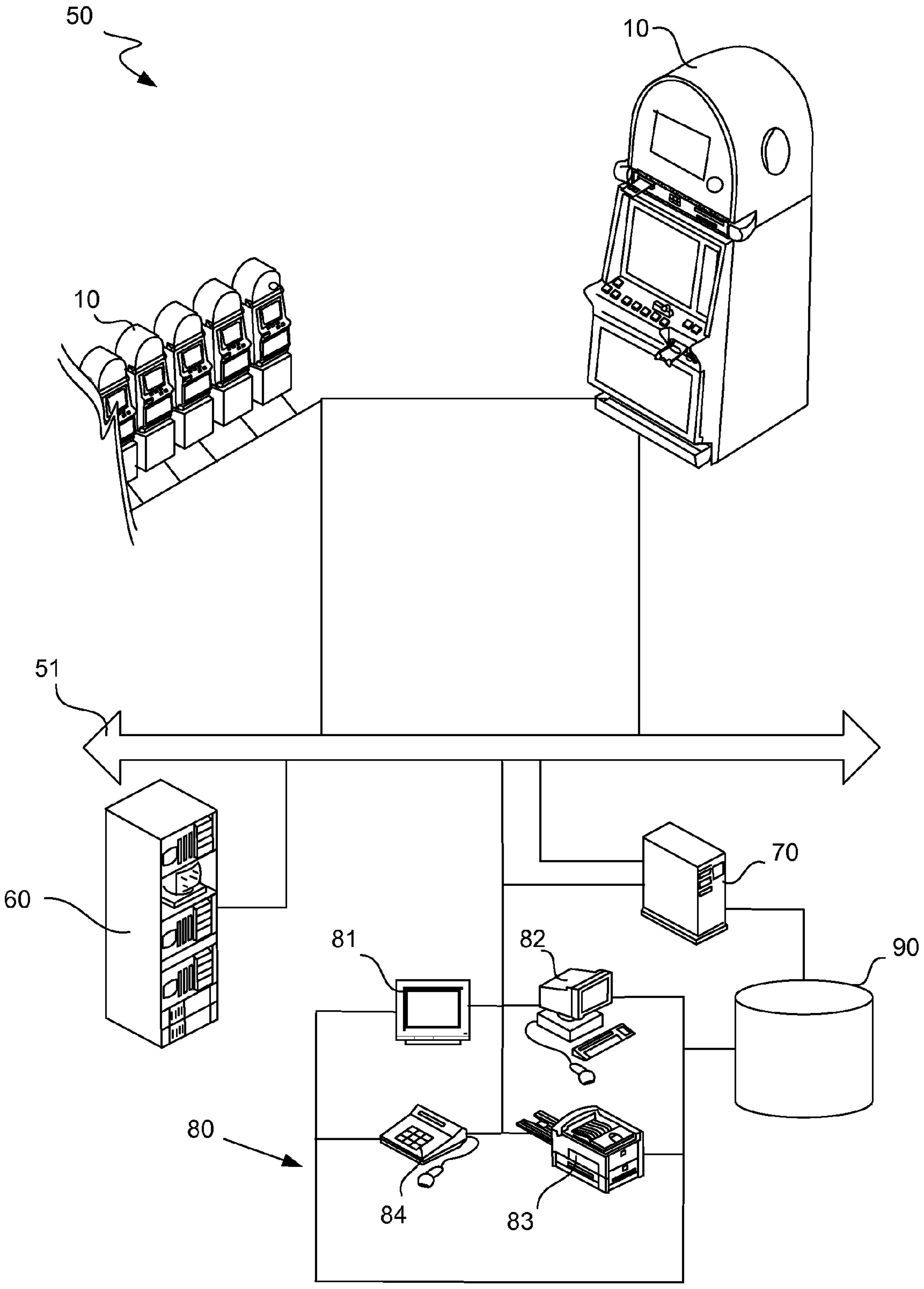
FIG. 11 illustrates in block diagram format an exemplary network infrastructure.

Turning now to FIG. 11, an exemplary network infrastructure for providing a gaming system having one or more gaming machines is illustrated in block diagram format. Exemplary gaming system 50 has one or more gaming machines, various communication items, and a number of host-side components and devices adapted for use within a gaming environment. As shown, one or more gaming machines 10 adapted for use in gaming system 50 can be in a plurality of locations, such as in banks on a casino floor or standing alone at a smaller non-gaming establishment, as desired. Common bus 51 can connect one or more gaming machines or devices to a number of networked devices on the gaming system 50, such as, for example, a general-purpose server 60, one or more special-purpose servers 70, a sub-network of peripheral devices 80, and/or a database 90.

A general-purpose server 60 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 50 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 70 or another similar component within a general-purpose server 60 also preferably includes a connection to a database or other suitable storage medium 90. Database 90 is preferably adapted to store many or all files containing pertinent data or information regarding cashless instruments such as tickets, among other potential items. Files, data and other information on database 90 can be stored for backup purposes, and are preferably accessible at one or more system locations, such as at a general-purpose server 60, a special purpose server 70 and/or a cashier station or other sub-network location 80, as desired.

While gaming system 50 can be a system that is specially designed and created new for use in a casino or gaming establishment, it is also possible that many items in this system can be taken or adopted from an existing gaming system. For example, gaming system 50 could represent an existing cashless gaming system to which one or more of the inventive components or program modules are added. In addition to new hardware, new functionality via new software, modules, updates or otherwise can be provided to an existing database 90, specialized server 70 and/or general-purpose server 60, as desired. In this manner, the methods and systems of the present invention may be practiced at reduced costs by gaming operators that already have existing gaming systems, such as an existing EZ Pay® or other cashless gaming system, by simply modifying the existing system. Other modifications to an existing system may also be necessary, as might be readily appreciated.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A gaming machine operable for playing a reel-based game, said gaming machine comprising:

at least one projection surface for displaying images associated with said reel-based game, said projection surface extending across substantially all of a cylindrical surface defined by a circumference and width of a reel on said gaming machine; and a projection system configured to project said images on said at least one projection surface when said gaming machine is operable for playing said reel-based game, wherein said projection system is further configured to project said images on said at least one projection surface in a manner that simulates rotation of at least one mechanical reel, wherein said at least one projection surface is configured to rotate and wherein said projection system is configured to project said images onto said at least one projection surface as said at least one projection surface rotates, wherein said projection system comprises one or more projection engines and one or more lenses, wherein at least one lens is configured with a variable radius, and wherein said projection system is configured to optically project said images on said projection surface which are visible from a first point of view without requiring that said projection system be visible from said first point of view.

2. A gaming machine as recited in claim 1, wherein said images include one or more symbols or indicia.

3. A gaming machine as recited in claim 1, wherein said gaming machine is further operable to obtain projection data that can be used by said projection system to project said images on said at least one projection surface.

4. A gaming machine as recited in claim 1, wherein said projection of said images is coordinated with said rotation in a manner that simulates said rotation of said at least one mechanical reel.

5. A gaming machine as recited in claim 4, wherein said reel rotates about a horizontal axis.

6. A gaming machine as recited in claim 4, wherein said reel rotates about a vertical axis.

7. A gaming machine as recited in claim 4, wherein said gaming machine further comprises:

a rotation engine configured to rotate said reel, wherein said rotation engine is configured in an external configuration with respect to said at least one reel, thereby allowing said reel to be driven externally.

8. A gaming machine as recited in claim 7, wherein said rotation engine includes a stepper motor or a DC motor that engages one or more gears, pulleys and/or friction wheels to rotate said reel.

9. A gaming machine as recited in claim 7, wherein said gaming machine further comprises one or more support blocks or bearings configured to support said at least one reel.

10. A gaming machine as recited in claim 1, wherein said at least one lens includes a lens configured with a constant radius, and wherein said projection system is configured to use pixel warping to project said images.

11. A gaming machine as recited in claim 1, wherein said one or more projection engines comprise a digital light processing (DLP) projector or a liquid crystal display (LCD) projector.

12. An apparatus for simulating a mechanical reel reel-based game that can be played in connection with a plurality of mechanical reels configured to rotate with images affixed to said plurality of mechanical reels, said apparatus comprising:

a plurality of projection reels configured to rotate, each projection reel comprising a projection surface extending across substantially all of a cylindrical surface defined by a circumference and width of said projection reel; and a projection system operable to project said images onto said plurality of projection reels as said plurality of projection reels rotate, wherein said projection system comprises one or more projection engines and one or more lenses, wherein at least one lens is configured with a variable radius, and wherein said projection system is configured to optically project said images on said projection reels which are visible from a first point of view without requiring that said projection system be visible from said first point of view.

13. An apparatus as recited in claim 12, wherein said apparatus is a gaming machine.

14. An apparatus as recited in claim 12, wherein said plurality of projection reels includes two (2), three (3), four (4) or five (5) projection reels, and wherein said projection system includes one projector configured to project said images.

15. An apparatus as recited in claim 14, wherein said projector is positioned in a central location with respect to said plurality of projection reels.

16. An apparatus as recited in claim 12, wherein said one or more projection engines comprise a DLP projector or an LCD projector.

17. A computer-implemented method for playing a reel-based game on a gaming machine, said method comprising:

obtaining projection data for projecting at least one image; and projecting, based on said projection data, said at least one image on at least one projection surface, said projection surface extending across substantially all of a cylindrical surface defined by a circumference and width of a reel on said gaming machine, wherein said projecting displays said at least one image on said at least one projection surface in a manner that simulates rotation of at least one mechanical reel, wherein said gaming machine comprises one or more projection engines and one or more lenses, wherein at least one lens is configured with a variable radius, and wherein said projection system is configured to optically project said images on said projection surface which are visible from a first point of view without requiring that said projection system be visible from said first point of view;

rotating said at least one projection surface during said projecting.

18. A computer-implemented method as recited in claim 17, wherein said at least one image includes one or more symbols or indicia.

19. A computer-implemented method as recited in claim 17, wherein said gaming machine is further operable to obtain said projection data used to project said at least one image on said at least one projection surface.

20. A computer-implemented method as recited in claim 17, wherein said one or more projection engines comprise a DLP projector or an LCD projector.

21. A non-transitory computer readable medium including computer program code for playing a reel-based game, said computer readable medium comprising:

computer program code for obtaining projection data for projecting at least one image via one or more projection engines and one or more lenses, wherein at least one lens is configured with a variable radius; and computer program code for projecting, based on said projection data, said at least one image on at least one rotatable projection surface as said at least one rotatable projection surface rotates in a manner that simulates rotation of at least one mechanical reel, said rotatable projection surface extending across substantially all of a cylindrical surface defined by a circumference and width of a reel on said gaming machine, and wherein said projection system is configured to optically project said images on said projection surface which are visible from a first point of view without requiring that said projection system be visible from said first point of view.

22. A gaming machine for playing a reel-based game, the gaming machine comprising:

at least one rotatable projection surface for displaying images associated with the reel-based game, said projection surface extending across substantially all of a cylindrical surface defined by a circumference and width of a reel on said gaming machine, the images described by image data downloadable to the gaming machine from a central server; and a projection system configured to project the images on the at least one rotatable projection surface when the gaming machine is operable for playing the reel-based game and while the at least one rotatable projection surface is rotating, wherein the projection system is further configured to project the images on the at least one rotatable projection surface in a manner that simulates rotation of at least one mechanical reel, and wherein said projection system comprises one or more projection engines and one or more lenses, wherein at least one lens is configured with a variable radius, and wherein said projection system is configured to optically project said images on said projection surface which are visible from a first point of view without requiring that said projection system be visible from said first point of view.

23. A gaming machine as recited in claim 22, wherein said one or more projection engines comprise a DLP projector or an LCD projector.

* * * * *